Dec. 16, 1958    R. H. BAILES ET AL    2,864,667
ANIONIC EXCHANGE PROCESS FOR THE RECOVERY OF URANIUM
AND VANADIUM FROM CARBONATE SOLUTIONS
Filed June 16, 1953    4 Sheets-Sheet 1

INVENTORS.
DAVID A. ELLIS
RAY S. LONG
RICHARD H. BAILES
BY
Roland A. Anderson
ATTORNEY.

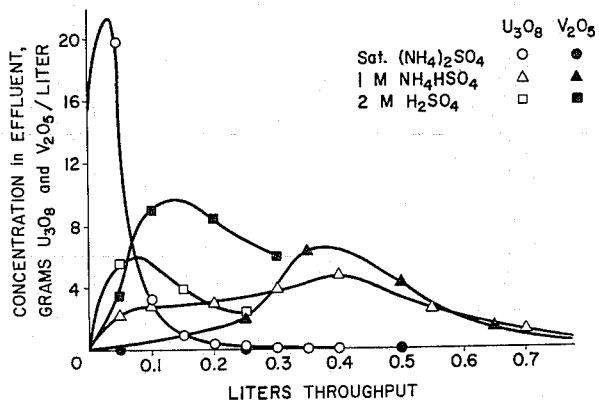

Fig. 2. Elution of Uranium from Dowex 1, -50+100 mesh, after Adsorption from Leach Liquor A-1 Temperature 25° C.

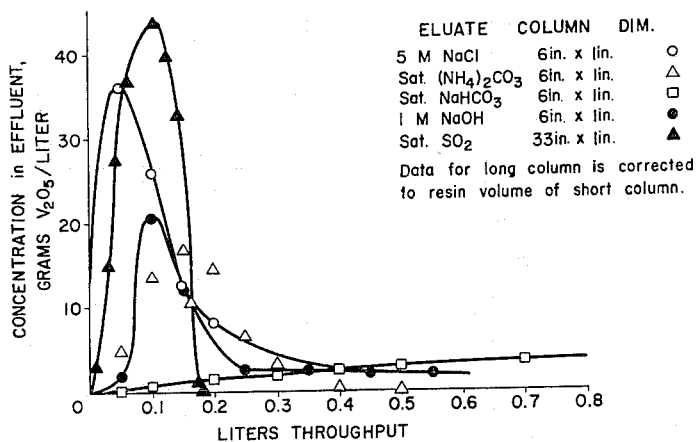

Fig. 4. Elution of Vanadium from Dowex 1, -50+100 mesh, after Adsorption from Leach Liquor A-1 and Prior Elution of Uranium with $(NH_4)_2SO_4$

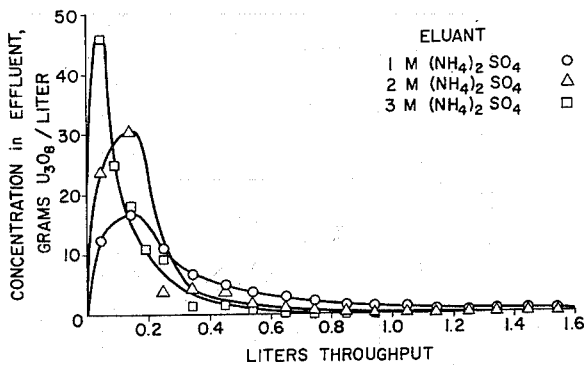

Fig. 3. Elution of Uranium from Dowex 1, -50+100 mesh, after Adsorption from 5 Liters Leach Liquor A-1

INVENTORS.
DAVID A. ELLIS
RAY S. LONG
RICHARD H. BAILES
BY Roland A. Anderson
ATTORNEY.

INVENTORS.
DAVID A. ELLIS
RAY S. LONG
RICHARD H. BAILES

ATTORNEY.

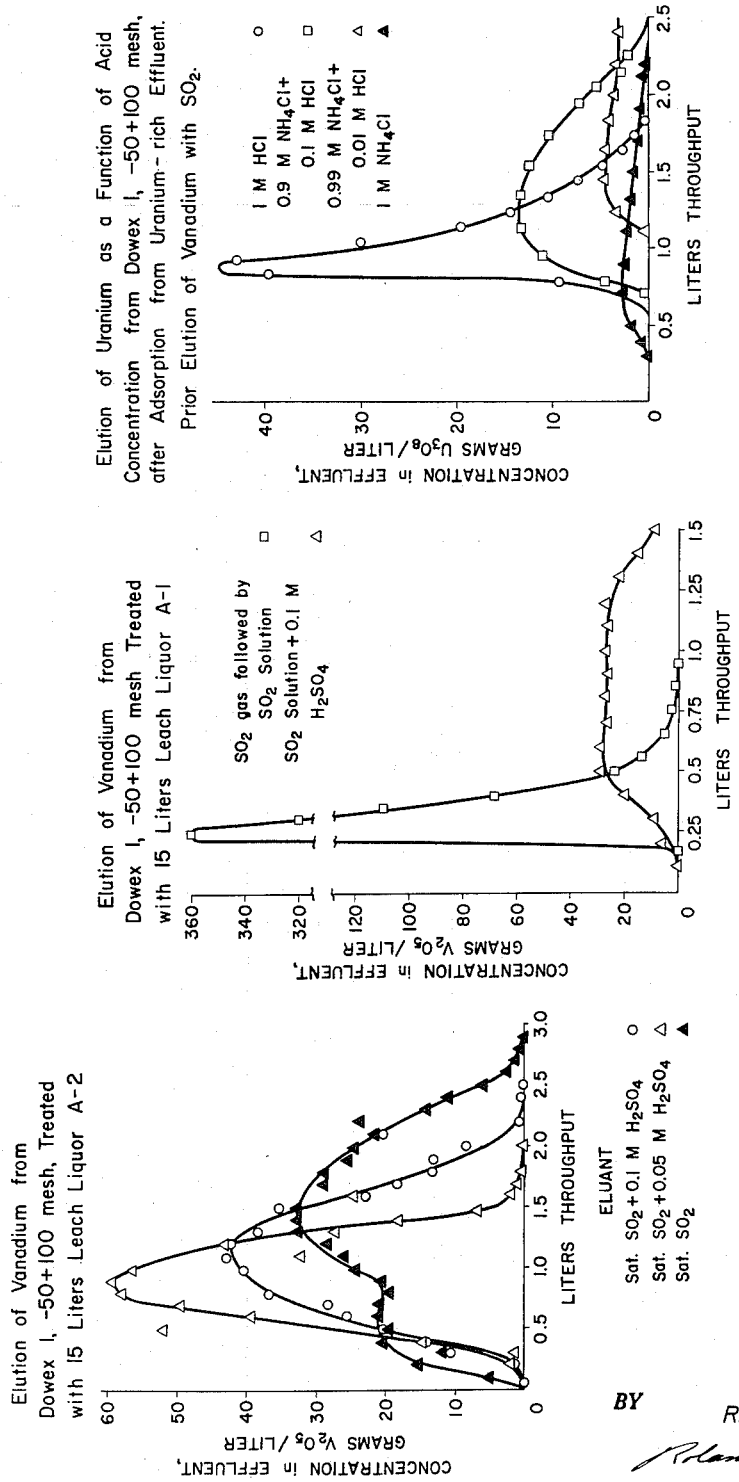

United States Patent Office 2,864,667
Patented Dec. 16, 1958

2,864,667

ANIONIC EXCHANGE PROCESS FOR THE RECOVERY OF URANIUM AND VANADIUM FROM CARBONATE SOLUTIONS

Richard H. Bailes, Walnut Creek, and David A. Ellis and Ray S. Long, Concord, Calif., assignors to the United States of America as represented by the United States Atomic Energy Commission Application June 16, 1953, Serial No. 362,122

14 Claims. (Cl. 23—14.5)

The present invention relates to an ion exchange process for recovering uranium and vanadium from ores and, more particularly, to such a process employing anionic exchange adsorption of uranium and vanadium from solutions obtained by leaching various ores with a carbonate solution.

As a preliminary step in recovering uranium and vanadium from ores, such as carnotite, they are roasted in air to facilitate subsequent leaching operations. Low vanadium carnotite ores are roasted in air at about 500° C. The hot ore is quenched in hot 5–10% $Na_2CO_3$ solution and is allowed to leach for several hours whereupon all of the uranium and a substantial part of the vanadium are dissolved by the solution. With high vanadium content ores, more complete recovery of the vanadium becomes economically attractive and a modified method is employed to insure a more complete dissolution of the vanadium. In this modified process, about 10% by weight sodium chloride is added to the ore which is then roasted at about 800° C. and quenched as before. The solution in the latter case contains the uranium and vanadium together with a large amount of chloride and many impurities.

It has now been discovered that the uranium and vanadium can be economically purified and recovered from nonsalt roast carbonate leach liquors by adsorption on an anionic exchange resin and subsequent selective elution of the uranium and vanadium. The uranium and vanadium are eventually recovered from the eluates by alternative methods. Salt roast carbonate leach liquors are adaptable to the present process following treatment to lower the chloride content of the solution.

Accordingly, it is an object of the invention to provide a method for recovering and purifying uranium and vanadium.

Another object of the invention is to provide an anionic exchange process for recovering and purifying uranium and vanadium from carbonate leach solutions.

Still another object of the invention is to provide a process for purifying uranium and vanadium wherein an anionic exchange resin is employed to adsorb said materials from a carbonate leach solution and the uranium and vanadium are eluted separately from the resin.

A further object of the invention is to provide a method of recovering uranium and vanadium from carbonate leach solutions wherein the carbonate leach solution is only moderately altered and may be economically recycled.

A still further object of the invention is to provide an anionic exchange process which includes the precipitation recovery of uranium and vanadium from eluates obtained in the process.

Other objects and advantages of the invention will become apparent by consideration of the following description taken together with the accompanying drawings of which:

Figure 2 is a graphical illustration of the results obtained by selective elution of uranium with various sulfate elutriants;

Figure 3 is a graphical illustration of the results obtained by selective elution of uranium with various concentrations of ammonium sulfate solutions;

Figure 4 is a graphical illustration of the results obtained in eluting vanadium from an anionic exchange resin following selective elution of the uranium;

Figure 8 is a graphical illustration of the results obtained by eluting vanadium from anionic exchange columns from which columns uranium was previously eluted;

Figure 9 is a graphical illustration of the elution of vanadium from anionic exchange columns after selective elution of uranium therefrom; and Figure 10 is a graphical illustration of the elution of uranium with various chloride and acidified chloride solutions following selective elution of vanadium with $SO_2$ solution.

In operating the process of the invention, there is first obtained a carbonate leach solution of the character described. For illustrative purposes, typical analyses of such leach liquors are presented in Table I, wherein compositions of both salt roast and nonsalt roast leach liquors are set forth. Such liquors are identified to simplify reference thereto as required hereinafter.

TABLE I

Analysis of leach liquors

|  | Leach Liquor A (Non-salt roast liquor) | | Leach Liquor B (Salt roast liquor) |
| --- | --- | --- | --- |
|  | A-1 | A-2 |  |
| $U_3O_8$, g./l. | 2.79 | 1.79 | 0.969 |
| $V_2O_5$, g./l. | 4.96 | 2.70 | 3.93 |
| $CO_3^-$, g./l. | 17.5 | 36.5 | 23.5 |
| $HCO_3^-$, g./l. | 12.5 | 12.0 | 7.5 |
| $SO_4^-$, g./l. | 29.8 | 12.0 | 1.42 |
| $Cl^-$, g./l. | 0.17 | 0.18 | 15.7 |
| Fe, g./l. | 0.009 | 0.015 |  |
| $Al_2O_3$, g./l. | 1.8 | 0.0 |  |
| $PO_4$, g./l. | 0.6 | 0.6 |  |

It will be appreciated that the compositions indicated may vary widely as to the values shown and presence or absence of particular impurities as well as the presence of other impurities without materially affecting the operation of the process. In such a solution, uranium is present in the hexavalent oxidation state and vanadium in the pentavalent state. A major advantage of the present process is that impurities of many classes are tolerated.

Figure 1:
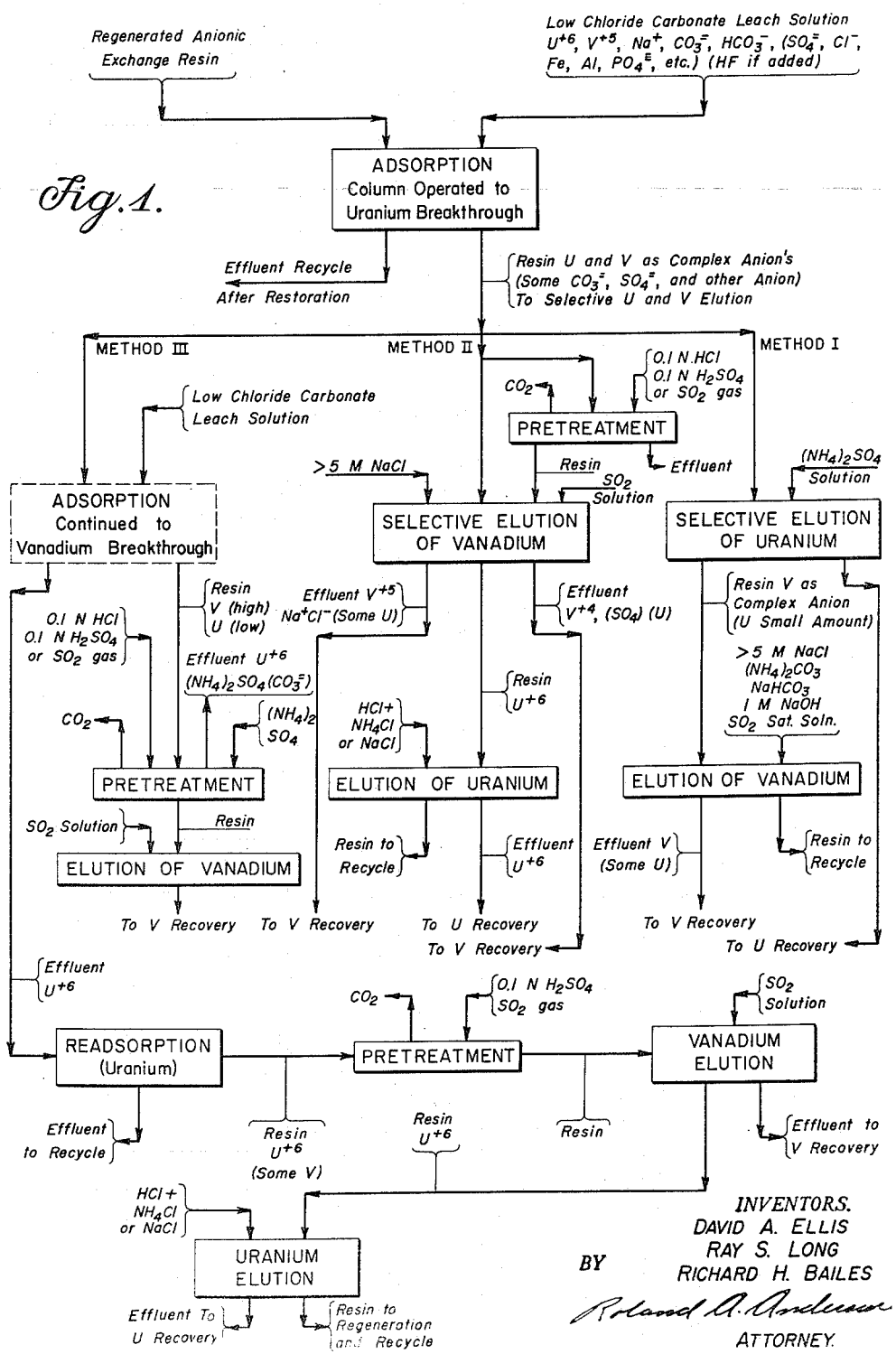
Figure 1 is a flow diagram illustrating the process of the invention.

In accordance with the invention, with reference to Fig. 1 of the drawing, the low chloride solutions, such as A-1 and A-2, contacted with an anionic exchange resin bearing replaceable anions, e. g., sulfate, resulting in the adsorption of the uranium and vanadium as anionic complexes thereon. With the high chloride solutions, a preliminary chloride removal step must be employed. For example, a base such as NaOH may be added to the solution resulting in a mass precipitation of the uranium and vanadium with impurities. After separation from the chloridic solution, the precipitate can be redissolved in a carbonate solution and processed as a low chloride leach solution. Certain mineral acids may be used in place of the carbonate in this operation.

As the initial step in the anionic exchange process of the invention, a low chloride carbonate leach solution is contacted with a strongly basic anionic exchange resin, preferably, disposed in a column or deep bed. In general, such strongly basic anionic exchange resins comprise a solid hydrocarbon matrix having highly basic functional groups such as quaternary ammonium, guanidinium or other highly basic amine substituents, associated therewith. Commercially available examples of such resins are Dowex 1, Amberlite IRA-400, and Amberlite IR-4B. Many other similar materials are known. Dowex 1, in —50+100 mesh size, yields superior results and is, therefore, preferred. Dowex 1, used in following specific examples of processes operated in accordance with the invention, is stated by the manufacturer to be equivalent in function and substantially the same as Dowex 2. Furthermore, these strongly basic anion exchange resins are stated to be manufactured by procedures which are substantially the same as described in Examples 2 and 4 of U. S. Patent No. 2,614,099, filed December 29, 1948, and issued October 14, 1952.

In adsorbing the desired uranium and vanadium values from a carbonate leach solution, such as A-1, uranium is at first adsorbed almost completely; however, if the adsorptive operation is continued, the uranium is eluted by the effluent solution as may be determined by comparing uranium content of the inflowing and effluent solutions. This effect can be used to separate the uranium and vanadium as described hereinafter. Uranium adsorbed by the resin may exceed 25 mg./ml. of wet settled resin while vanadium may exceed 45 mg./ml. of wet settled resin. Certain anionic impurities will also be adsorbed by the resin.

Raising the temperature of the solution to about 60° C. improves uranium adsorption; however, the vanadium adsorption suffers somewhat. From this effect, it is concluded that several vanadium complexes are present in the solution. Anionic complexes based on the colorless pentavalent ion do not appear to be adsorbed as well as complexes of the more highly colored vanadate anion. The increase of temperature therefore seems to promote conversion of the less colored state. Effluent leach solution from the column is recycled in the leaching operation with minor replenishment as required.

Adsorption of vanadium at both 25° C. and 60° C. is markedly improved by the addition of HF to the solution. This effect is consistent with the promotion of anionic exchange adsorption of vanadium by fluoridic materials as disclosed in the copending application of Richard H. Bailes and David A. Ellis; Serial No. 313,558; filed October 7, 1952. Only catalytic quantities of fluoride are required for effectiveness.

It has been noted that carbonate and sulfate concentrations may be increased to near saturation with only minor effect upon uranium and vanadium adsorption; however, even a few percent of chloride reduce adsorption of the uranium and vanadium to a negligible value. With uranium and vanadium solutions of higher concentration, adsorption efficiency increases markedly.

Following adsorption on the resin, uranium and vanadium can be selectively eluted therefrom by either of several alternative methods, as follows:

I. Selective elution of uranium followed by elution of the vanadium.

II. Selective elution of the vanadium followed by elution of the uranium.

III. A method wherein a first anionic exchange column is operated in such a fashion that it is saturated with respect to vanadium adsorption and results in elution of the uranium by the leach solution with the consequent production of a uranium-enriched effluent, followed by re-adsorption of the uranium from the enriched effluent on a second anionic exchange column. The vanadium and uranium are subsequently eluted from the first and second columns, respectively, and are recovered from the eluates.

METHOD I

In accordance with this method, selective elution of the uranium prior to elution of the vanadium is accomplished by means of certain specific elutriants. In practice, $(NH_4)_2SO_4$ solutions of about 1.5 M to about saturated concentrations were found to selectively elute the uranium with a quite sharply defined peak and to elute practically no vanadium. About 2.0–3.0 M $(NH_4)_2SO_4$ solutions have an optimum effect and are, therefore, preferred. Lower concentrations of this salt produce less sharply defined elution bands. Other sulfate salts, as well as $H_2SO_4$, are relatively ineffective for performing the selective elution of uranium. Some of the uranium remains adsorbed on the resin. The following examples are illustrative of various phases of this method of operation:

Example I 1 x 6 inch columns of Dowex 1, a strongly basic anionic exchange resin, were employed to adsorb uranium and vanadium from leach liquor A-1. Saturated $(NH_4)_2SO_4$, 1 M $(NH_4)HSO_4$ and 2 M $H_2SO_4$ elutriant solutions were passed through the columns to elute the uranium under conditions and with the results illustrated in Fig. 2 of the accompanying drawing. As may be noted therein $H_2SO_4$ and $(NH_4)HSO_4$ gave much lower and much more diffuse peaks than did $(NH_4)_2SO_4$. Also, these elutriants removed some of the vanadium.

Example II 1 x 33 inch columns of Dowex 1 were first contacted with leach liquor A-2 and then the uranium was eluted with either 1 M, 2 M, or 3 M $(NH_4)_2SO_4$ solution at a temperature of 25° C., with the results illustrated in Fig. 3. As indicated therein, the peak uranium concentration progressively increased as the elutriant concentration increased; however, with this relatively long column, a precipitate formed and plugged the column when saturated $(NH_4)_2SO_4$ solution was employed. Vanadium concentration in these eluates was equivalent to only about 0.16 g./liter.

It is believed that the elution of uranium by ammonium sulfate solutions is rather unique and may be explained as follows: Carbonate ions are eluted from anionic exchange resin by sulfate ions. In the presence of ammonium ions the carbonate-bicarbonate equilibrium in the column is shifted to produce sufficient bicarbonate to elute both uranium and vanadium from the resin. However, the vanadium is immediately re-absorbed as a sulfate complex. Thus, while $(NH_4)_2CO_4$ (as well as other ammonium salts) will elute both U and V, $(NH_4)_2SO_4$ will elute only the uranium. Therefore, it may be seen that ammonium sulfate is a unique and specific reagent for the indicated operation.

Following elution of the uranium, the vanadium can be eluted by a number of different agents. 5 M NaCl, saturated $(NH_4)_2CO_3$, saturated $NaHCO_3$ and 1 M NaOH solutions elute the vanadium in a plus 5 oxidation state; however, residual uranium is eluted also. Therefore, recovery of vanadium from these eluates must take this factor into account. Saturated $SO_2$ solutions selectively reduce the vanadium to a plus 4 oxidation state wherein it is effectively eluted by the $SO_2$ solution, probably as a cation. In this method, the residual uranium remains on the resin and may be recovered therefrom during recycle. The manner of performing these elutions of vanadium is illustrated by the following example:

Example III

Individual 1 x 6 inch columns of Dowex 1 resins, from which the U had been eluted with $(NH_4)_2SO_4$ solution, were eluted with one of the following agents:

5 M NaCl
Saturated $(NH_4)_2CO_3$
Saturated $NaHCO_3$
1 M NaOH

A 1 x 33 inch column of similar material was eluted with saturated $SO_2$ solution, the results being corrected to correspond to the foregoing, and all of which results are graphically illustrated in Fig. 4. As may be seen therefrom, the $SO_2$ solution gives the better results.

Following selective elution by this method, i. e., Method I, the uranium and vanadium can be recovered from the eluates by methods described more fully hereinafter.

METHOD II

In accordance with the second method, selective elution of the vanadium is accomplished by means of certain specific elutriants prior to the elution of the uranium. Concentrated NaCl and $SO_2$ solutions are specific for eluting the vanadium alone. NaCl solutions above about 5 M concentration do not elute the uranium but elute the vanadium in the plus 5 oxidation state while $SO_2$ solutions, as noted above, selectively reduce the vanadium to the plus 4 state wherein it is selectively eluted, as a cation, away from the uranium. Pretreatment of the column with about 0.1 N HCl, 0.1 N $H_2SO_4$ or $SO_2$ is required to prevent excessive agitation and churning in the resin bed during treatment with the $SO_2$ solution. The following examples disclose additional details of the manner of conducting the selective vanadium elution:

Example IV

A 1 x 6 inch column of Dowex 1 was treated with leach solution A–1, to uranium breakthrough. 5 M NaCl was then passed through the column resulting the the vanadium being quite completely eluted yielding a solution having a peak concentration equivalent to 54 g. $V_2O_5$/liter. A small amount of uranium also appeared in the eluate (0.4 g. $U_3O_8$/liter).

Figure 5:
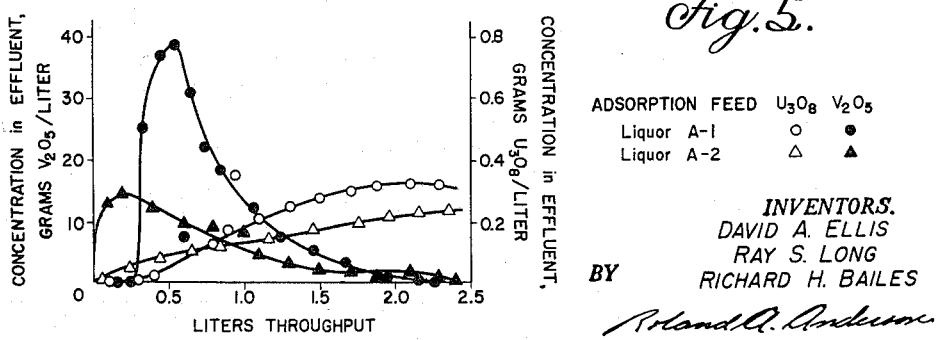
Figure 5 is a graphical illustration of the results of the selective elution of vanadium from an anionic exchange resin with saturated $SO_2$ solution prior to elution of the uranium.

Example V 1 x 33 inch columns of Dowex 1 were contacted with leach liquors A–1 and A–2 to uranium breakthrough. Then 0.1 N $H_2SO_4$ was passed through the column to prevent violent reaction during subsequent treatment with saturated $SO_2$ solution. Finally, saturated $SO_2$ solution was passed through the column resulting in elution of the vanadium and a small amount of uranium, as illustrated in Fig. 5 of the drawing. As may be seen therein, elution of the column saturated with leach liquor A–1 gave a higher vanadium peak than that saturated with leach liquor A–2. This was caused by a higher vanadium loading, in the first case, due to a higher content thereof in the respective leach liquor. The uranium which appeared in the eluate is indicated in said Fig. 5 on a greatly expanded scale as compared with the vanadium. U equivalent to only 200–300 mg. $U_3O_8$/liter, representing 5% of the original U, actually appeared during this elution.

Example VI 1 x 33 inch columns of Dowex 1 were contacted with leach liquor A–2 to uranium breakthrough. $SO_2$ gas was then passed through the column to be followed by saturated $SO_2$ solution which selectively eluted the vanadium. As a result of this treatment, vanadium peak concentrations in the eluate were increased to, equivalently, 75 grams $V_2O_5$/liter compared with 15 grams $V_2O_5$/liter obtained in Example V. The uranium concentration was reduced to about 100 mg. of $U_3O_8$/liter. Since lesser volumes were employed in this experiment, this value represents only 1% of the total U present on the resin.

Following selective elution of the vanadium, as described in Examples V and VI, the uranium was eluted from the resin with solutions containing 0.9 M $NH_4Cl$ or NaCl and 0.1 N HCl. The uranium and vanadium are recoverable from the respective eluates as will be more fully described hereinafter.

METHOD III

As noted hereinbefore, the basis for this, the third method of selective elution, was discovered when it was noted, when using liquors such as A–1 and A–2, that during early phases of anionic exchange column adsorptions, both the vanadium and uranium are quite completely adsorbed; however, when the adsorption is continued after uranium breakthrough occurs, uranium content of the effluent suddenly increases to a value considerably above that of the incoming leach solution. This indicates that the leach solution becomes an elutriant at this point. Effluent leach solution, collected from this point until vanadium breakthrough occurs, is enriched as much as several-fold in uranium content and contains only minor amounts of vanadium relative to the original leach solution.

Vanadium was found to be easily removed from such columns by $SO_2$ solutions; however, direct treatment of the resin caused severe gassing and part of the uranium was eluted by the solution. Gassing is practically eliminated by pretreating the column with 0.1 N HCl, 0.1 N $H_2SO_4$ solutions, or $SO_2$ gas. Some uranium still appears in the eluate. Pretreatment with $(NH_4)_2SO_4$ solution eliminates both the gassing and appearance of uranium in the $SO_2$ eluate. Solutions of about 1.5–4 M are satisfactory for this purpose while 2.0 M solutions produce about the best results. The uranium can be recovered from the effluent by acidification to destroy the carbonate and then precipitating the uranium as a diuranate with ammonia. The filtrate from such solution can be recycled after pH readjustment with $H_2SO_4$.

The uranium in the enriched effluent leach solution is even more easily adsorbed by a second anionic exchange column due to the increase in uranium and decrease in vanadium concentrations and occurs without leaching of uranium when carried to vanadium breakthrough, as in the first column. Both the uranium and vanadium are substantially completely adsorbed until breakthrough occurs.

Ammonium sulfate or ammonium carbonate solutions were found to yield eluates from these second uranium columns with satisfactory peak concentration; however, these elutriants used alone were capable of removing only about 60% of the uranium. Carbonate solutions removed vanadium along with the uranium. Pretreatment with $SO_2$ gas or 0.1 N $H_2SO_4$, followed by elution with saturated $SO_2$ solution results in removal of almost all of the vanadium and little uranium. Subsequent elution with acidified chloride solutions, particularly, NaCl or $NH_4Cl$ and HCl solution mixtures is very effective, although $NH_4Cl$ alone is quite poor. About 1 M $NH_4Cl$ and above about 0.01 M of HCl are satisfactory; however, 0.1 M HCl is about optimum for a solution containing about 1 M of $NH_4Cl$.

Specific details of the operation of this, the third, method of selective elution, will become apparent from the following examples:

Example VII

Figure 6:
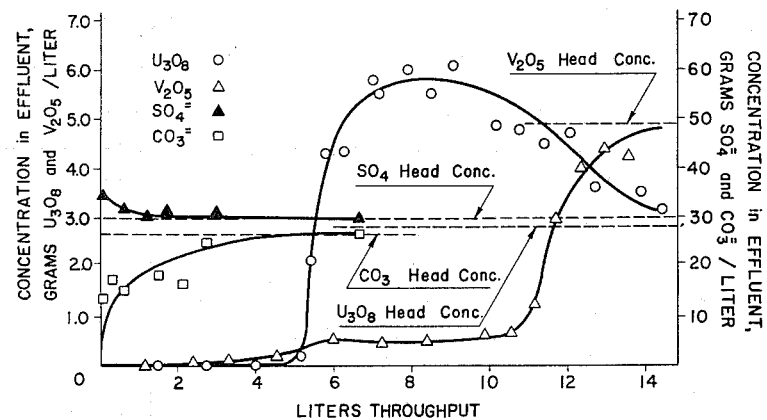
Figure 6 is a graphical illustration of the results obtained during contact of a carbonate leach solution with an anionic exchange resin.

A 1 x 33 inch column of Dowex 1 was contacted with leach liquor A–1, at a temperature of 25° C. Such column contained 400 ml. of Dowex 1, −50 to +100 mesh size, in the sulfate form. Results of this operation are graphically illustrated in Fig. 6 of the accompanying drawing.

As may be seen therein, the uranium adsorption curve is divisible into three regions. In the first region, the effluent is seen to be very low in both uranium and vanadium. In the second region, the uranium concentration in the effluent rises dramatically (uranium breakthrough point) to a value considerably above that of the inflowing leach solution while the vanadium concentration remains low. Evidently, in this region, the vanadium in the inflowing solution displaces (elutes) the uranium from the resin. In the third region, the vanadium concentration in the effluent also begins to rise (vanadium breakthrough) and there is also considerable vanadium in the effluent.

*Example VIII*

Figure 7:
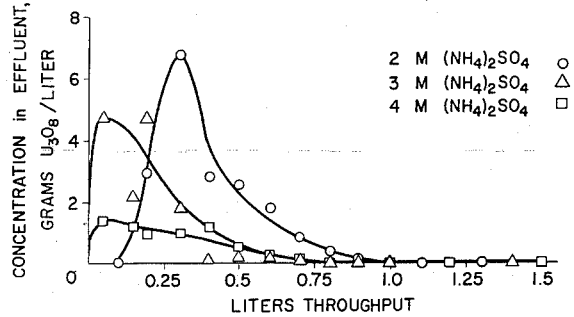
Figure 7 is a graphical illustration of the results obtained with selective elution of uranium from an anionic exchange resin employing various ammonium sulfate solutions.

1 x 33 inch columns of Dowex 1 as employed in Example VII were contacted with 15 liters of leach liquor A. This amount is less than required for uranium saturation. Then a column was eluted with each of the following solutions: 2 M, 3 M, and 4 M $(NH_4)_2SO_4$. The results are illustrated in Fig. 7. Uranium was recovered from these solutions by acidification to destroy carbonate followed by precipitation of diuranate with ammonia.

*Example IX*

1 x 33 inch columns of Dowex 1 resin, as above, were contacted with 15 liters of leach liquor A–1. Uranium was eluted with $(NH_4)_2SO_4$ solutions and then the vanadium was eluted with the following solution mixtures:

Saturated $SO_2 + 0.1$ M $H_2SO_4$
Saturated $SO_2 + 0.05$ $H_2SO_4$
Saturated $SO_2$ The results are illustrated in Fig. 8 of the drawing. As may be seen from the drawing, acidification of the solution tends to sharpen and heighten the elution peaks.

*Example X*

A 1 x 33 inch column of resin was contacted with 15 liters of leach A–2 as above. $SO_2$ gas was passed through the column to prevent later gassing caused by carbonate. Then the vanadium was eluted with a saturated $SO_2$ solution with the results illustrated in Fig. 9. For comparison, results of an elution with $SO_2$ solution $+0.1$ M $H_2SO_4$ are also shown. As may be seen therein, the elution with $SO_2$ gas followed by $SO_2$ solution is more sharply defined and the peak concentration is about 10 times greater.

*Example XI*

1 x 33 inch columns of Dowex 1 resin were contacted with 15 liters of leach liquor, as above. Vanadium was eluted by contacting the column with $SO_2$ gas and then with saturated $SO_2$ solution. HCl, $NH_4Cl$ and mixed solutions thereof were then employed to elute the uranium as indicated in Fig. 10 of the drawing.

RECOVERY OF URANIUM AND VANADIUM FROM ELUATES

The uranium eluates disclosed in the foregoing fall into two distinct classes and vanadium into a single class.

Vanadium is conveniently recovered from the $SO_2$ eluates by heating to drive off $SO_2$ gas and adding ammonia whereupon substantially all of the vanadium is precipitated. After separation from the solution such precipitates are heated to 400° C. and are thereby converted into vanadium oxide. Analyses of the calcined material indicate almost completely pure vanadium oxide as does spectrographic analysis. A similar result will be obtained with all of the other vanadium eluates described in the foregoing; however, carbonate must be eliminated as by acidification prior to treatment with ammonia, in the case of the carbonate, bicarbonate or sodium hydroxide eluates.

Uranium is recovered from the $(NH_4)_2SO_4$ eluates by acidification as with $H_2SO_4$ to remove carbonate. Then neutralization to pH 7 with ammonia is employed to precipitate the uranium. A typical precipitate of this nature, after calcining at 800° C., analyzed 96.5% $U_3O_8$ and only 1.3% $V_2O_5$. The eluate is recyclable after neutralization with $H_2SO_4$.

Acidified ammonium chloride eluates, e. g., 0.1 N $HCl+0.9$ N $NH_4Cl$, containing ca. 5 g. $U_3O_8$/liter are treated with ammonia to precipitate the uranium therefrom. After restoration by adding HCl such $(NH_4)Cl$ eluates are recyclable. Precipitates are obtainable which, after drying the calcining at 800° C., analyze 99.0 to 100% $U_3O_8$ with less than about 0.10% of $V_2O_5$. However, lower grade precipitates are often obtained by this method. Such lower grade precipitates can be processed by a subsequent ion exchange method. For example, an eluate which yielded a primary calcined precipitate analyzing 96.6% $U_3O_8$ and 0.46% $V_2O_5$, was treated with ammonia to precipitate the uranium. After separation from the eluate, the precipitate was dissolved in 5 N HCl, forming therein, anionic exchange resin adsorbable complexes. The solution was passed through an anionic exchange resin column (Dowex 1) wherein the uranium was adsorbed by the resin. Water was employed to elute the uranium from the resin and ammonia was added to the uranium-bearing portion of the eluate to precipitate the uranium. Calcination of this precipitate at 800° C. yielded a material analyzing 99.4% $U_3O_8$. No vanadium but a trace of calcium was detected by spectrographic analysis.

While there has been described in the foregoing what may be considered to be preferred embodiments of the invention, modifications may be made therein without departing from the spirit of the invention and it is intended to cover all such as fall within the scope of the appended claims.

What is claimed is:

1. In a process for recovering uranium and vanadium from a carbonate leach solution, the steps comprising adsorbing the uranium and vanadium from said solution with a strongly basic anionic exchange resin, first selectively eluting uranium from said resin with an ammonium sulfate solution, then eluting vanadium from said resin subsequent to said uranium elution with an agent selected from the group consisting of above about 5 M NaCl solution, $(NH_4)_2CO_3$ solution, $NaHCO_3$ solution, about 1 M NaOH solution and saturated $SO_2$ solution, and recovering the uranium and vanadium from the respective eluate.

2. In a process for recovering uranium and vanadium from a carbonate leach solution, the steps comprising adsorbing the uranium and vanadium from said solution with a strongly basic anionic exchange resin, first selectively eluting vanadium from said resin with an agent selected from the group consisting of saturated $SO_2$, and above about 5 M NaCl solutions, then eluting uranium from the resin subsequent to said vanadium elution with an agent selected from the group consisting of HCl plus NaCl and HCl plus $NH_4Cl$ solutions, and recovering the uranium and vanadium from the eluates.

3. In a process for recovering uranium and vanadium from a carbonate leach solution, the steps comprising adsorbing the uranium and vanadium from said solution with a strongly basic anionic exchange resin, pretreating the resin with an agent selected from the group consisting of about 0.1 N HCl solution, about 0.1 N $S_2SO_4$ solution and $SO_2$ gas, selectively eluting vanadium from said resin with saturated $SO_2$ solution, eluting uranium from the resin with an agent selected from the group consisting of HCl plus NaCl and HCl plus $NH_4Cl$ solutions, and recovering the uranium and vanadium from the eluates.

4. In a method for recovering uranium and vanadium from a carbonate leach solution, the steps comprising passing the solution through a first column of a strongly basic anionic exchange resin until vanadium breakthrough occurs, whereby the effluent solution is enriched in uranium content and the vanadium is chiefly retained by the resin, adsorbing uranium from the enriched effluent solution on a second column of a strongly basic anionic exchange resin, and recovering the uranium and vanadium from the respective resin columns.

5. In a method for recovering uranium and vanadium from a carbonate leach solution, the steps comprising passing the solution through a first column of a strongly basic anionic exchange resin until vanadium breakthrough occurs, whereby the effluent solution is enriched in uranium content and the vanadium is chiefly retained by the resin, adsorbing uranium from the enriched effluent solution on a second column of a strongly basic anionic exchange resin, pretreating the said first column with an agent selected from the group consisting of about 0.1 N HCl solution, about 0.1 N $H_2SO_4$ solution, and $SO_2$ gas, eluting the vanadium from the treated column with saturated $SO_2$ solution, and eluting uranium from the said second column.

6. In a method for recovering uranium and vanadium from a carbonate leach solution, the steps comprising flowing the solution through a first column of a strongly basic anionic exchange resin until vanadium breakthrough occurs, whereby the effluent solution is enriched in uranium content and the vanadium is chiefly retained by the resin, adsorbing uranium from the enriched effluent solution on a second column of a strongly basic anionic exchange resin, pretreating the said first column with an agent selected from the group consisting of about 0.1 N HCl solution, about 0.1 N $H_2SO_4$ solution, and $SO_2$ gas, eluting the vanadium from the treated column with saturated $SO_2$ solution, pretreating said second column with an agent selected from the group consisting of about 0.1 N HCl solution and $SO_2$ gas, selectively eluting residual vanadium from said second column with saturated $SO_2$ solution, and eluting the uranium from said second column with an agent selected from the group consisting of about 0.1 N HCl plus NaCl and about 0.1 N HCl plus $(NH_4)Cl$.

7. In a method for recovering uranium and vanadium from a carbonate leach solution, the steps comprising flowing the solution through a first column of a strongly basic anionic exchange resin until vanadium breakthrough occurs, whereby the effluent solution is enriched in uranium content and the vanadium is chiefly retained by the resin, adsorbing uranium from the enriched effluent solution on a second column of a strongly basic anionic exchange resin, pretreating the said first column with $(NH_4)_2SO_4$ solution, eluting the vanadium from the treated column with saturated $SO_2$ solution, and eluting the uranium from the said second column.

8. In a process for recovering uranium and vanadium from a carnotite ore, the steps comprising subjecting said ore to a preliminary salt roasting treatment, leaching the uranium and vanadium from said ore with a carbonate solution, removing chloride ion from said leach solution, adding a small amount of HF to the solution, adsorbing the uranium and vanadium from the leach solution by means of a strongly basic anionic exchange resin, then selectively eluting the uranium and vanadium from said resin, and recovering the uranium and vanadium from the eluates.

9. The process as otherwise defined in claim 1, but wherein said ammonium sulfate solution has a concentration in the range of about 1.5 M to about saturation.

10. The process as otherwise defined in claim 2, but wherein said agent employed to elute the uranium consists of about 0.1 N HCl plus about 1 N NaCl and about 0.1 N HCl plus about 1 N $NH_4Cl$ solutions.

11. The process as otherwise defined in claim 2, but wherein the vanadium is recovered from the said $SO_2$ eluate by heating to drive off the $SO_2$, adding ammonia to precipitate the vanadium, and calcining the precipitate to produce vanadium pentoxide.

12. The process as otherwise defined in claim 1, but wherein the vanadium is recovered from said $(NH_4)_2CO_3$, $NaHCO_3$ and NaOH eluate by acidifying and heating to destroy carbonate, adding ammonia to precipitate the vanadium, and calcining the precipitate to produce vanadium pentoxide.

13. The process as otherwise defined in claim 2, but wherein vanadium is recovered from said eluates by adding ammonia thereto to precipitate the vanadium, separating the precipitate from the solution, calcining the precipitate to produce vanadium pentoxide, and wherein uranium is recovered from said eluates by adding ammonia thereto to precipitate the uranium as a diuranate, separating the diuranate precipitate from the solution, and calcining the diuranate to produce uranium oxide.

14. The process as otherwise defined in claim 1, but wherein the uranium is recovered from said ammonium sulfate eluate by acidifying the solution to eliminate carbonate, adding ammonia to precipitate the uranium, and calcining the precipitate to yield uranium oxide.

References Cited in the file of this patent

UNITED STATES PATENTS

| | | |
|---|---|---|
| 808,839 | Haynes et al. | Jan. 2, 1906 |
| 1,945,611 | Knight et al. | Feb. 6, 1934 |

FOREIGN PATENTS

| | | |
|---|---|---|
| 626,882 | Great Britain | July 22, 1949 |

OTHER REFERENCES

Weil: Atomics, vol. 1, No. 17, pages 345–356 (1950).